(12) United States Patent
Yamada et al.

(10) Patent No.: US 9,003,329 B2
(45) Date of Patent: Apr. 7, 2015

(54) IMAGE DISPLAY APPARATUS

(75) Inventors: Takeshi Yamada, Tokyo (JP); Kazuaki Matoba, Tokyo (JP); Susumu Nakagakiuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 455 days.

(21) Appl. No.: 12/625,702

(22) Filed: Nov. 25, 2009

(65) Prior Publication Data

US 2010/0122169 A1  May 13, 2010

(51) Int. Cl.
*G06F 3/0482* (2013.01)
*H04N 5/445* (2011.01)
*H04N 21/485* (2011.01)

(52) U.S. Cl.
CPC ......... *H04N 5/44513* (2013.01); *H04N 21/485* (2013.01)

(58) Field of Classification Search
CPC .............................. G06F 3/048; G06F 3/0482
USPC .................. 715/719, 810, 825, 811
See application file for complete search history.

(56) References Cited

U.S. PATENT DOCUMENTS

| | | | |
|---|---|---|---|
| 5,999,228 A * | 12/1999 | Matsuura et al. | 348/569 |
| 6,005,577 A * | 12/1999 | Breitlow | 715/825 |
| 6,121,968 A * | 9/2000 | Arcuri et al. | 715/825 |
| 6,169,543 B1 * | 1/2001 | Wehmeyer | 725/47 |
| 6,795,097 B1 * | 9/2004 | Yamaguchi et al. | 715/810 |
| 7,590,430 B1 * | 9/2009 | Urbanek | 455/566 |
| 7,882,449 B2 * | 2/2011 | Lacock et al. | 715/810 |
| 2001/0026291 A1 * | 10/2001 | Uchida | 345/810 |
| 2002/0054146 A1 * | 5/2002 | Fukumoto et al. | 345/810 |
| 2003/0032455 A1 | 2/2003 | Watanabe et al. | |
| 2005/0076309 A1 * | 4/2005 | Goldsmith | 715/811 |
| 2005/0091609 A1 * | 4/2005 | Matthews et al. | 715/804 |
| 2005/0138566 A1 * | 6/2005 | Muller et al. | 715/759 |
| 2005/0250549 A1 | 11/2005 | Watanabe et al. | |
| 2005/0273729 A1 * | 12/2005 | Kumashio | 715/825 |
| 2006/0136842 A1 * | 6/2006 | Charles et al. | 715/825 |
| 2006/0174215 A1 * | 8/2006 | Yan et al. | 715/825 |
| 2006/0218499 A1 * | 9/2006 | Matthews et al. | 715/765 |
| 2006/0288308 A1 * | 12/2006 | Enomoto et al. | 715/811 |
| 2007/0097269 A1 * | 5/2007 | Tsukamoto | 348/705 |
| 2007/0130535 A1 * | 6/2007 | DeMaio et al. | 715/779 |
| 2007/0130544 A1 * | 6/2007 | Kim et al. | 715/828 |
| 2007/0143707 A1 * | 6/2007 | Yun et al. | 715/811 |
| 2007/0150839 A1 * | 6/2007 | Danninger | 715/825 |

(Continued)

FOREIGN PATENT DOCUMENTS

| | | |
|---|---|---|
| EP | 1 067 453 A1 | 2/2001 |
| JP | 9-305360 A | 11/1997 |

(Continued)

*Primary Examiner* — Daeho Song
(74) *Attorney, Agent, or Firm* — Birch, Stewart, Kolasch & Birch, LLP

(57) ABSTRACT

A simplified menu includes menu items of a "user menu" in which a user can change and customize a menu, a "user menu selection" for selecting a menu item capable of being set in the user menu, and a "detailed menu switch" for switching the menu from a simplified menu to a detailed menu. The "user menu selection" is displayed in the simplified menu, which is not a menu of a different hierarchy. Accordingly, the user can perform an operation in the simplified menu.

4 Claims, 4 Drawing Sheets

(56) References Cited

U.S. PATENT DOCUMENTS

| | | |
|---|---|---|
| 2007/0270187 A1 | 11/2007 | Haneda |
| 2007/0283293 A1* | 12/2007 | Nakamura et al. ............ 715/811 |
| 2008/0009325 A1* | 1/2008 | Zinn et al. ..................... 455/566 |
| 2008/0059912 A1* | 3/2008 | Scherpa et al. ............... 715/853 |
| 2008/0155471 A1* | 6/2008 | Lynn et al. .................... 715/811 |
| 2008/0207188 A1* | 8/2008 | Ahn et al. ..................... 455/418 |
| 2009/0019396 A1* | 1/2009 | McCarthy ..................... 715/827 |
| 2009/0031245 A1* | 1/2009 | Brezina et al. ................ 715/781 |
| 2009/0158212 A1* | 6/2009 | Dykstra-Erickson et al. ............................ 715/811 |

FOREIGN PATENT DOCUMENTS

| | | |
|---|---|---|
| JP | 2002-335363 | 11/2002 |
| JP | 2003-058292 | 2/2003 |
| JP | 2006-099803 | 4/2006 |
| JP | 2006-254267 | 9/2006 |
| JP | 2007-310650 | 11/2007 |

* cited by examiner

F I G . 6
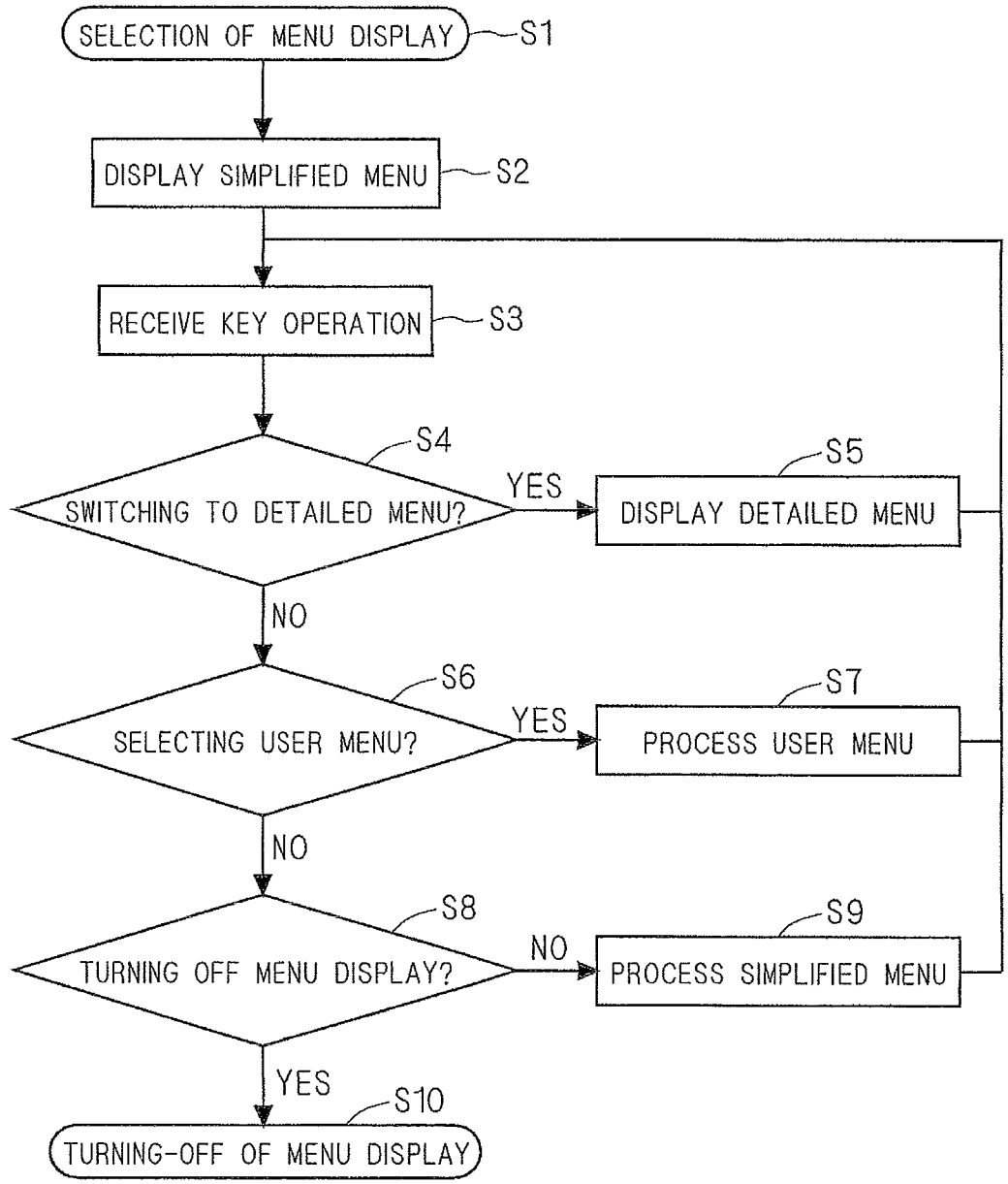

IMAGE DISPLAY APPARATUS

BACKGROUND OF THE INVENTION

1. Field of the Invention

The present invention relates to an image display apparatus, and more particularly, to an image display apparatus including a menu in which adjustment items and setting items are displayed hierarchically.

2. Description of the Background Art

In a typical image display apparatus, a menu in which a list of adjustment items and setting items is shown is displayed on a display screen, and a user operates the menu to perform adjustment or setting of a function. In recent years, the adjustment items and the setting items have been increased along with improvements in performance and function of the image display apparatus. Accordingly, there has been employed a configuration in which the menus is made to be hierarchical and is displayed for each hierarchy, and an item desired by the user is selected to perform adjustment and setting.

However, as the result of an increase in the number of hierarchies, the user needs to first select a hierarchy and then select the desired item from the hierarchy to operate the desired item before the user reaches a desired setting item, which inevitably increases operations of the user. Moreover, the user needs to select a hierarchical menu even in a case of a frequently used function, and thus a given number of operations are required. Further, in a case of performing a plurality of operations, an operation for shifting from a certain hierarchical menu to another hierarchical menu is required, which further increases the number of operations in some cases.

As a measure against the above, for example, FIG. 5 of Japanese Patent Application Laid-Open No. 09-305360 (1997) discloses a technology related to a television system in which a customized menu is provided to reduce the number of operations.

In the above-mentioned television system described in Japanese Patent Application Laid-Open No. 09-305360 (1997), a menu for customizing a menu is provided in the hierarchical menu, and thus the user has to shift to the hierarchical menu in order to change the setting for customizing. As a result, when customizing is performed frequently, an operation of changing the setting in the hierarchical menu becomes complicated.

SUMMARY OF THE INVENTION

An object of the present invention is to provide an image display apparatus in which operations when a user customizes a menu are reduced and thus the menu can be easily customized.

An aspect of the present invention relates to an image display apparatus which performs adjustment and setting of a function by selecting a predetermined menu item from a menu displayed on a display screen, which includes: a video signal processing unit receiving a video signal input from an outside thereof and processing the video signal into a signal capable of being displayed on the display screen; a memory unit storing a setting content of a menu item displayed on the menu; and a control unit reading the setting content from the memory unit, and controlling the video signal processing unit to display the setting content as the menu on the display screen, wherein: the menu includes a non-hierarchical first menu and a hierarchical second menu; the first menu includes a defined menu item determined in advance and a selection menu item capable of being customized in the first menu; and the control unit reads the setting content from the memory unit so that the first menu is first displayed when the menu is displayed, and controls the video signal processing unit.

According to the above-mentioned image display apparatus, the selection menu item capable of being customized is provided in the non-hierarchical first menu, and control is made so that the first menu is first displayed when the menu is displayed. Accordingly, the user does not require an operation in a complicated hierarchical menu, whereby it is possible to customize a required menu item with a small number of operations.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart for describing a menu operation.

DESCRIPTION OF THE PREFERRED EMBODIMENT

Embodiment

<Apparatus Configuration>

Figure 1:
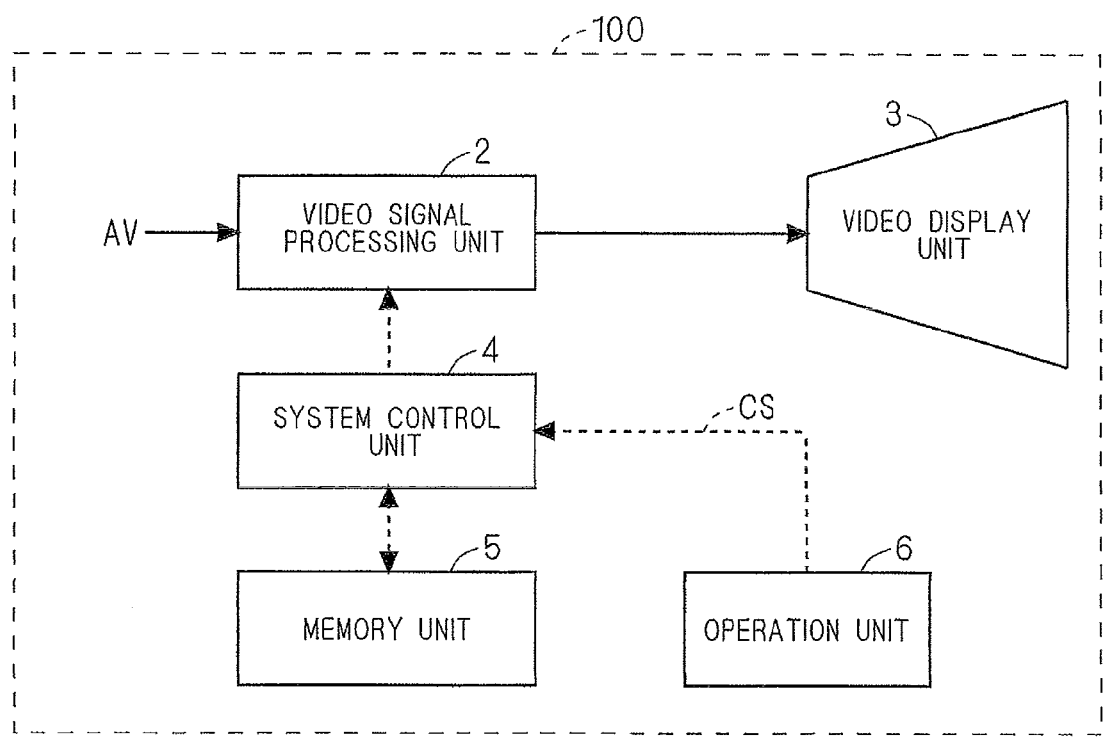
FIG. 1 is a block diagram showing a configuration of an image display apparatus according to an embodiment of the present invention.

FIG. 1 is a block diagram showing a configuration of an image display apparatus 100 according to an embodiment of the present invention. As shown in FIG. 1, the image display apparatus 100 includes; a video signal processing unit 2 which receives a video signal AV input from an outside thereof to process the video signal AV into a signal capable of being displayed; a video display unit 3 which displays video and a menu; an operation unit 6 for operating the image display apparatus 100; a system control unit 4 which controls the video signal processing unit 2 based on a control signal CS transmitted from the operation unit 6; and a memory unit 5 which sends and receives a signal with the system control unit 4 and stores a program of the system control unit 4, menu display contents and the like.

<Operation>

First, a schematic operation of the image display apparatus 100 is described.

A user performs a menu display operation and a menu operation via the operation unit 6, and then the control signal CS of the operation unit 6 is processed by the system control unit 4. For example, in a case of the menu display, a processed menu signal is transmitted from the system control unit 4 to the video signal processing unit 2, and the video signal processing unit 2 superimposes the video signal AV and the menu signal on each other to be displayed in the video display unit 3.

Next, the menu display is described in more detail with reference to FIG. 2.

Figure 2:
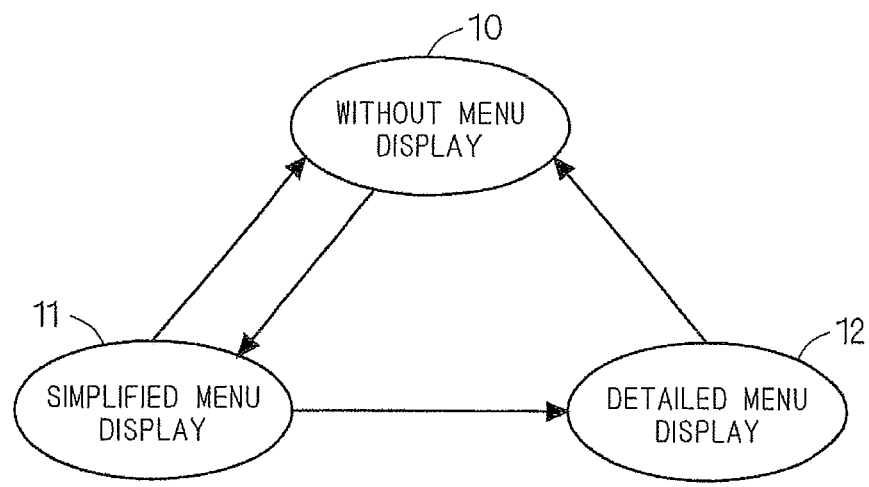
FIG. 2 is a diagram showing an operation of switching menu display.

As to a display state of the menu, there are three states of a state without menu display 10, a state of simplified menu display 11, and a state of detailed menu display 12 as shown in FIG. 2. An initial state is generally set to the state without menu display 10 by default, and when the user needs menu display, a simplified menu is first displayed on a display screen of the video display unit 3 by a predetermined operation. Note that the predetermined operation refers to an operation in which the operation unit 6 reacts to an operation of a button and a key of an input device such as a remote controller and a keyboard to operate the system control unit 4. Herein, this operation is referred to as the predetermined operation. Note that the configuration may be made so that the operation unit 6 includes an operation key and an instruction is issued from the operation key.

When the user instructs the menu display, the system control unit 4 operates via the operation unit 6, and data of a menu item constituting the simplified menu is first read from the memory unit 5. Then, the video signal processing unit 2 is controlled to display the simplified menu on the display screen.

In a case where the operation is finished in the simplified menu and the menu display is turned off, the state without menu display 10 can be set by the predetermined operation. In addition, it is possible to switch from the simplified menu display 11 to the detailed menu display 12 by the predetermined operation in the simplified menu. Accordingly, it is possible to turn off the menu display and switch from the detailed menu display 12 to the state without menu display 10 similarly by the predetermined operation. In this manner, the configuration is made so that the simplified menu display 11 is first set in the case of displaying the menu, and thus the user needs to first operate the menu by the simplified menu in the case of operating the menu.

Figure 3:
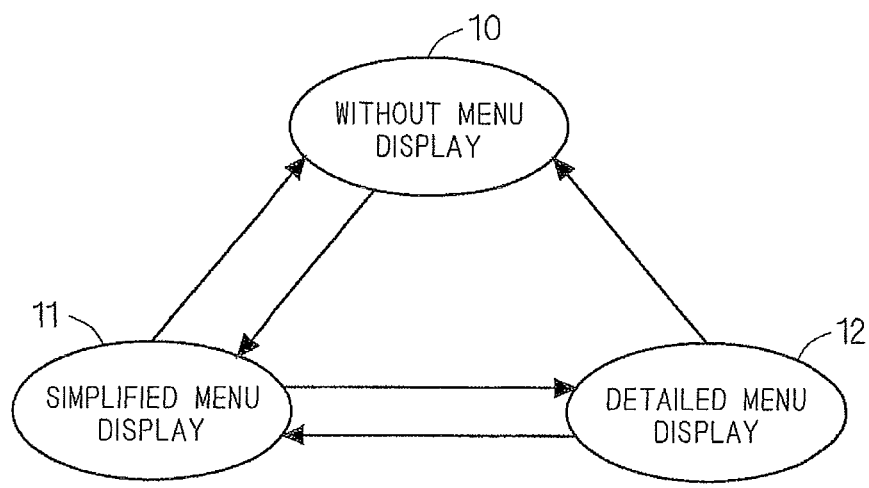
FIG. 3 is another diagram showing the operation of switching the menu display.

In the description given with reference to FIG. 2, there has been described an example in which switching is made from the simplified menu display 11 to the detailed menu display 12 by the predetermined operation in the simplified menu. However, as shown in FIG. 3, the configuration may be made so that the switching can be made from the detailed menu display 12 to the simplified menu display 11. Note that in the case where the menu is displayed also in this case, the simplified menu display 11 is a starting point, which is similar to the case of FIG. 2.

Figure 4:
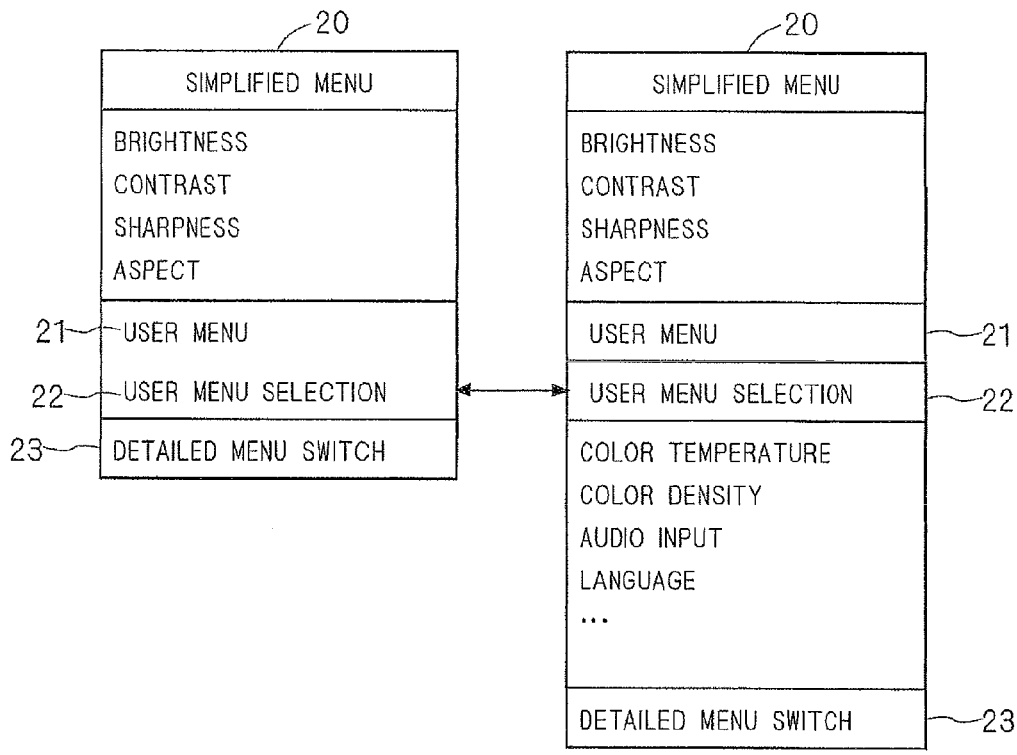
FIG. 4 is a diagram showing a configuration of a simplified menu.
Figure 5:
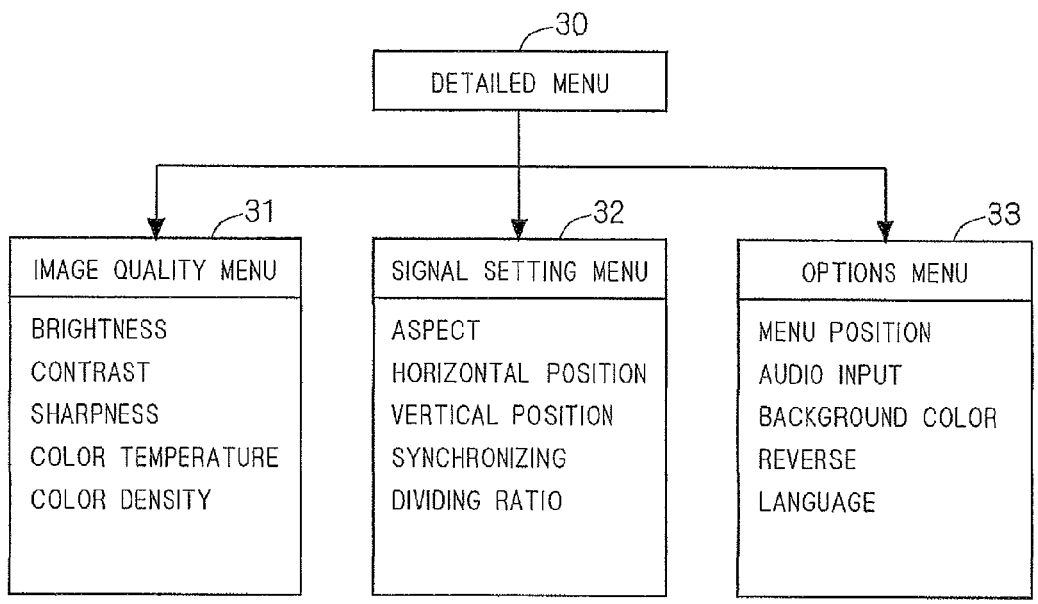
FIG. 5 is a diagram showing a configuration of a detailed menu.

Hereinafter, configuration examples of the respective menus are described with reference to FIG. 4 and FIG. 5.

<Configuration of Simplified Menu>

First, an example of a configuration of the simplified menu is described with reference to FIG. 4. A simplified menu 20 (first menu) shown in FIG. 4 is a non-hierarchical menu which does not include submenus. The simplified menu 20 includes, as menu items, "brightness" for changing brightness of a video signal, "contrast" for changing contrast of the video signal, "sharpness" for changing sharpness of the video signal, and "aspect" for changing an aspect ratio of the video signal. Those items are adjustment items for image quality which is frequently changed by the user, and are defined menu items set in advance.

When the menu items frequently used are set as the defined menu items, it is highly likely that the setting and adjustment are completed only by the simplified menu, whereby use of ease is enhanced.

The simplified menu 20 further includes menu items of a "user menu 21" in which the user can change and customize the menu, a "user menu selection 22 (selection menu item)" for selecting the menu item capable of being set to the user menu 21, and a "detailed menu switch 23 (menu switch item)" for switching the menu from the simplified menu to the detailed menu (second menu).

As described with reference to FIG. 2, the simplified menu 20 is first displayed in the case of displaying the menu, and hence the user can perform most of the operation by the menu items previously set and the "user menu 21" which can be customized by the user.

Here, a method of selecting the user menu 21 is described. When the "user menu selection 22" of the simplified menu 20 is designated, the user menu selection 22 is displayed in the simplified menu 20. When the user selects and determines the desired menu item in this menu, the item set as the "user menu 21" is immediately changed, and the menu item after being changed can be visually checked. At the same time, it is possible to perform new setting and adjustment in the menu item after being changed.

Note that the "user menu selection 22" is displayed in the simplified menu 20, which is not a menu of a different hierarchy. For this reason, the user can perform an operation in the simplified menu 20.

The user menu 21 is caused to be customized in the simplified menu 20 in this manner. Accordingly, the user can customize the user menu 21 without shifting to the hierarchical menu, and can easily set items without increasing the number of operations. Note that the description has been given assuming that one user menu is selected, but the present invention is not limited thereto. For example, the configuration may be made so that a plurality of user menus can be set.

<Configuration of Detailed Menu>

Next, an example of a configuration of the detailed menu is described with reference to FIG. 5. A detailed menu 30 shown in FIG. 5 is a hierarchical menu and is composed of a plurality of submenus.

As submenus, there are provided an image quality menu 31, a signal setting menu 32 and an options menu 33. The image quality menu 31 is composed of menu items for adjusting image quality of video, that is, "brightness", "contrast", "sharpness", "color temperature" and "color density". The signal setting menu 32 is composed of menu items for performing adjustment related to a signal, such as "aspect", "horizontal position", "vertical position", "synchronizing" and "dividing ratio".

The options menu 33 is composed of menu items other than those for adjustment of a video signal, such as "menu position", "audio input", "background color", "reverse" and "language".

The detailed menu 30 is a hierarchical menu, and thus respective items thereof need to be set after the selection of the submenu, which makes the operation more complicated compared with the simplified menu 20. However, the configuration is made so that menu items which do not need to be set frequently are set and adjusted in the detailed menu 30.

Note that the items of each submenu are just an example, and the present invention is not limited thereto. In addition, the number of submenus vary depending on a configuration of a menu, and the present invention is not limited thereto. Note that the number of operations for allowing the user selection increases when the number of items of each menu is increased, and menu items displayed on a display screen are made smaller and hard to be viewed. For these reasons, ten or less menu items are preferably displayed in one submenu. Similarly in the simplified menu 20, ten or less items are displayed while the other items are displayed by changing the user menu 21. In this manner, display which makes the required operation with a small number of operations is enabled.

<Menu Operation>

Next, an example of a menu operation is described with reference to a flowchart shown in FIG. 6 also with reference to FIG. 1.

The user selects a menu display by a predetermined operation (Step S1), and then the simplified menu is first displayed on the display screen of the video display unit 3 (Step S2).

When the operation unit 6 receives a key operation of the user (Step S3), the operation unit 6 discriminates a content of the operation and then determines whether the content of the operation is switching to the detailed menu (Step S4). If the content is switching to the detailed menu, the display is switched from the simplified menu to the detailed menu (Step S5). Meanwhile, if the content is not switching to the detailed menu, the operation unit 6 next determines whether the content is selecting the user menu (Step S6). Then, if the content is selecting the user menu, a list of menu items which can be selected is displayed in the simplified menu, and the user selects a desired menu item from the list. Then, the operation unit 6 changes the user menu, performs a processing (adjustment of color density or the like) in accordance with the relevant item (Step S7), and waits for a next key operation.

On the other hand, in a case where the content is not selecting the user menu in Step S6, the operation unit 6 determines whether the content is turning off the menu display (Step S8), and if the content is an operation for turning off the menu, the operation unit 6 turns off the menu display from the display screen (Step S10). Note that in a case where the content is not the operation for turning off the menu, the operation unit 6 performs a processing (adjustment of brightness or the like) in accordance with the item selected in the simplified menu in Step S9, and waits for a next key operation.

<Effects>

As described above, the configuration is made so that the simplified menu is first displayed when the menu display is selected, and that the simplified menu is switched to the detailed menu in accordance with the menu item for switching to the detailed menu as necessary. Accordingly, it is possible to customize required menu item with a small number of, operations.

Further, the configuration is made so that the required menu item can be customized by the user menu of the simplified menu, whereby the user does not require the operation in a complicated hierarchical menu when the menu is customized. As a result, the required menu item can be customized with a small number of operations.

Further, the items of the simplified menu are set to be small in number, and thus a desired menu item can be easily found thereamong. Accordingly, the required operation can be performed without difficulty.

Further, as to the menu items of the simplified menu and the menu items of the detailed menu, the configuration is made so that the same menu items are stored in the same memory unit 5. Accordingly, the setting content (setting value) of the simplified menu is reflected in the setting content of the detailed menu, and the content set in the detailed menu is conversely reflected in the simplified menu as well. As a result, it is unnecessary to add a memory. In addition, the menu item is shared between two menus, whereby it is possible to prevent the setting value of the same item in the respective menus from changing into another setting value.

<Modification>

The description has been given assuming that the image display apparatus 100 is applied to a display of a television system, a personal computer or the like. However, the present invention is applicable to a projector-type image display apparatus which projects video onto a screen. In this case, the video display unit 3 shown in FIG. 1 corresponds to a projecting unit or the like of the projector, and the display screen corresponds to a screen.

While the invention has been shown and described in detail, the foregoing description is in all aspects illustrative and not restrictive. It is therefore understood that numerous modifications and variations can be devised without departing from the scope of the invention.

What is claimed is:

1. An image display apparatus performing adjustment and setting of a function by selecting a predetermined menu item displayed on a display screen as part of menu functionality, comprising:
   a video signal processing unit receiving a video signal input from an outside thereof and processing the video signal into a signal capable of being displayed on said display screen;
   a memory unit storing a setting content of a menu item displayed as part of said menu functionality; and
   a control unit reading said setting content from said memory unit, and controlling said video signal processing unit to display said setting content on said display screen, wherein:
   said menu functionality includes a non-hierarchical first menu and a hierarchical second menu including a sub-menu, said first menu being accessible without making a selection in said hierarchical second menu;
   said first menu includes at least one defined menu item determined in advance and a user selection menu customizing said first menu, said user selection menu having a plurality of menu items in said second menu; and
   said control unit reads said setting content from said memory unit so that said first menu is first displayed including said at least one defined menu item and a user selection menu item of said user selection menu, and controls said video signal processing unit,
   wherein said control unit controls said video signal processing unit to display a drop-down menu including said plurality of menu items by selecting said user selection menu item in said first menu, and to display any menu item selected from the drop-down menu as a customized menu item in said first menu.

2. The image display apparatus according to claim 1, wherein said first menu further includes, as a menu item, a menu switch item for switching a display from said first menu to said second menu.

3. The image display apparatus according to claim 1, wherein:
   said memory unit stores setting contents of said first and second menus; and
   said control unit reads a menu item same in said first and second menus so that the setting contents thereof are equal to each other.

4. The image display apparatus according to claim 1, wherein said defined menu item includes a menu item frequently used.

* * * * *

UNITED STATES PATENT AND TRADEMARK OFFICE
CERTIFICATE OF CORRECTION

PATENT NO. : 9,003,329 B2  
APPLICATION NO. : 12/625702  
DATED : April 7, 2015  
INVENTOR(S) : Takeshi Yamada et al.

Page 1 of 1

It is certified that error appears in the above-identified patent and that said Letters Patent is hereby corrected as shown below:

ON THE TITLE PAGE:

Insert the following:

-- (30)  Foreign Application Priority Data

Dec. 11, 2008   (JP)   ........................... 2008-315388 --.

Signed and Sealed this  
Tenth Day of November, 2015

Michelle K. Lee  
*Director of the United States Patent and Trademark Office*